3,552,808
BRAKE CAM SHAFT BEARING
Robert V. Mathers, Grosse Pointe Farms, and William Trampus, Madison Heights, Mich., assignors to Fruehauf Corporation, Detroit, Mich., a corporation of Michigan
Filed Oct. 3, 1968, Ser. No. 764,869
Int. Cl. F16c 35/06
U.S. Cl. 308—29    4 Claims

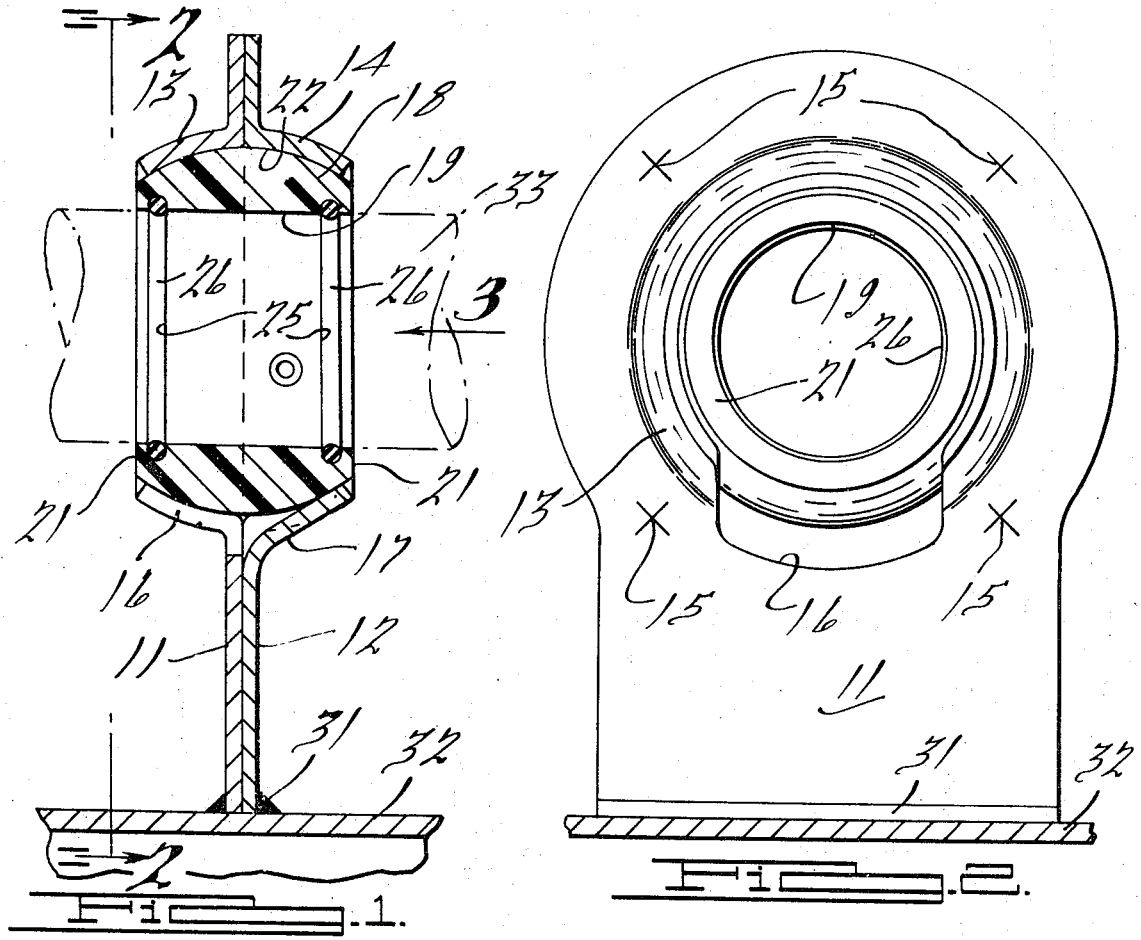
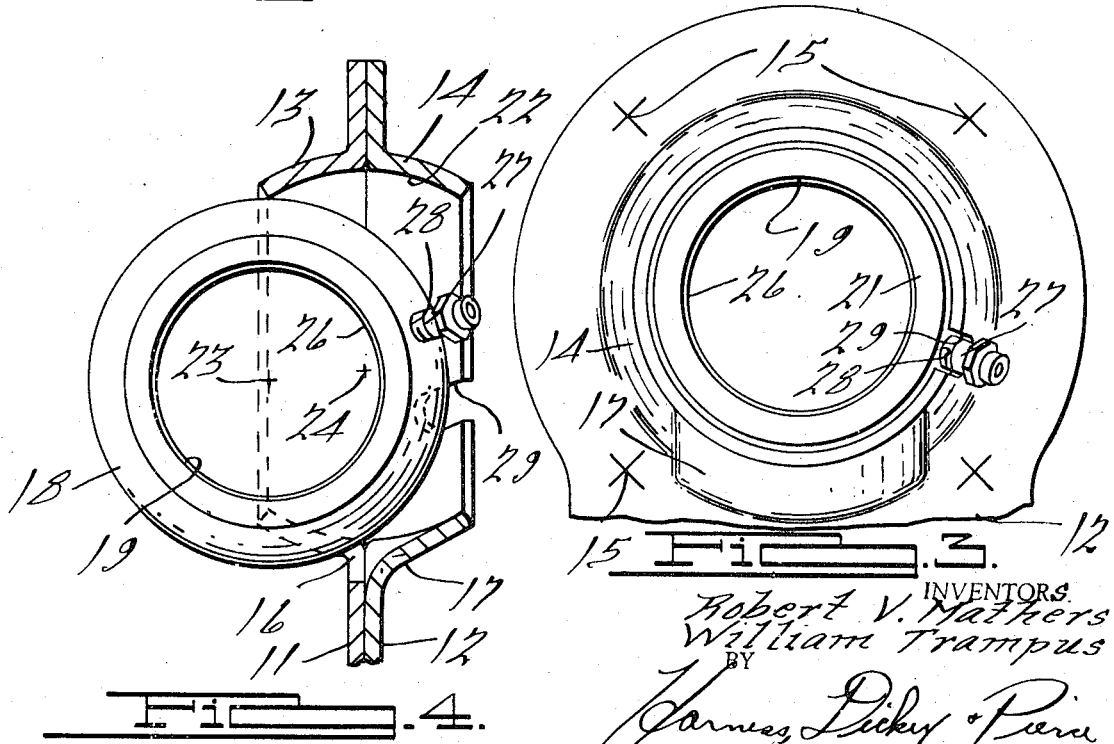

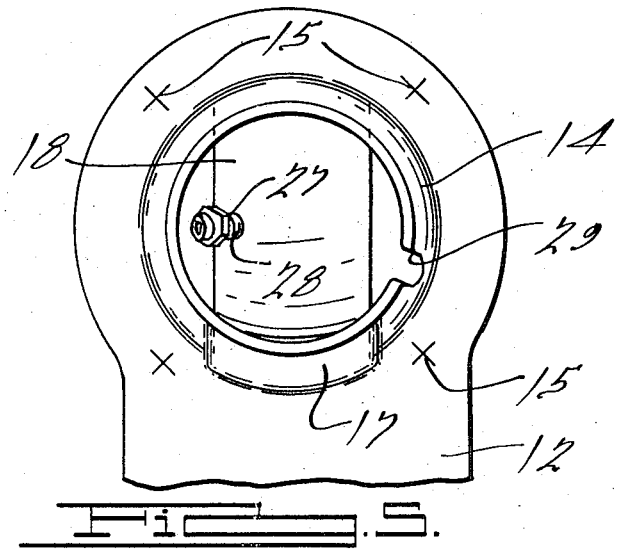
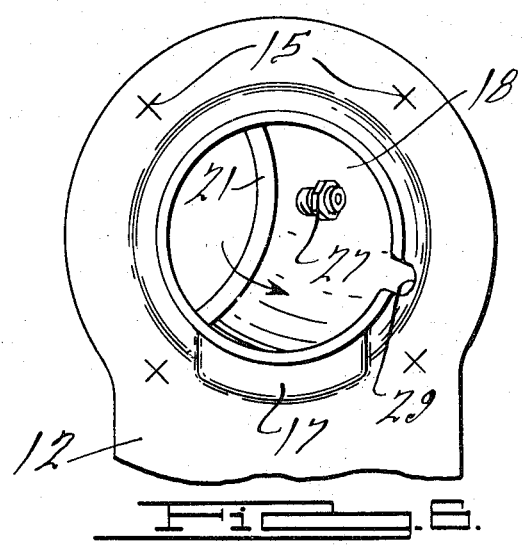
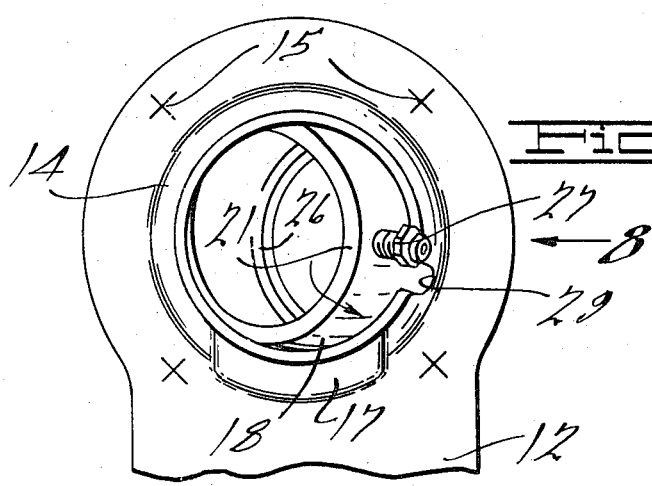
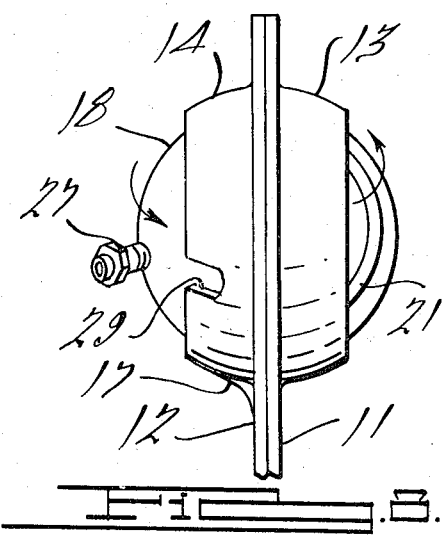
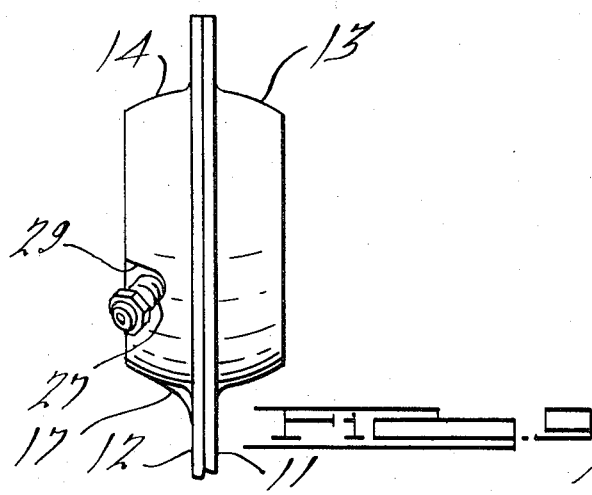

ABSTRACT OF THE DISCLOSURE

The bearing has a body made of two stampings which have truncated spherical sections forming a socket for supporting a truncated spherical body which passes therewithin in one position and is rotated thereafter to operable position. One of said stampings containing a through slot and the other a recess. A greased fitting on the truncated ball moves into a slot which prevents the rotation of the ball within the socket when in operable position.

BACKGROUND OF THE INVENTION

Reference may be had to the patent to J. E. Shafer, No. 2,397,164 for a disclosure of a bearing assembly over which the present ball and socket bearing is a substantial improvement.

SUMMARY OF THE INVENTION

A supporting body having a socket for a bearing ball is made from two like stampings provided with central truncated spherical wall sections. The wall sections are aligned forming the socket when the sheets of metal are welded or otherwise secured together. A truncated bearing ball has a through aperture for a shaft and is movable into and from the socket of the stampings. The bottom wall of one of the stampings is cut away to provide an opening slightly larger than the length of the shaft receiving aperture of the truncated ball. The adjacent portion of the wall of the other stamping is deflected downwardly to form a ramp which permit the ball, when turned 90° from its operating position, to be inserted within the socket. This places the center of the ball on the center of the socket which permits the ball to be turned 90° to shaft supporting position. The ball may be made of any bearing material and is herein illustrated as being made of a plastic material, more specifically a plastic material known as Zytel which is a trade name covering a polyamide resin procurable from the Du Pont Company. Annular recesses are provided in the aperture near the parallel faces of the ball for receiving O-rings for confining a lubricant between the shaft and cylindrical surface of the ball provided through a fitting carried by the ball. The ball is inserted with the fitting on the advancing side so that it will extend from the opposite opening of the socket and enter a notch in the edge of the wall thereof when the ball is rotated 90° to operative position. The fitting locks the bearing ball against rotation when a shaft extends therethrough.

BRIEF DESCRIPTION OF THE DRAWING

FIG. 1 is a sectional view of a brake cam shaft bearing embodying features of the present invention;
FIG. 2 is a sectional view of the structure illustrated in FIG. 1, taken on the line 2—2 thereof;
FIG. 3 is an end view of the structure illustrated in FIG. 1, as viewed from the point 3 thereof;
FIG. 4 is a view of the structure illustrated in FIG. 1, with the bearing ball being inserted within the socket thereof;
FIG. 5 is a view of the structure of FIG. 4 after the ball has been inserted within the socket with the center of the ball located on the center of the socket;
FIG. 6 is a view of the structure of FIG. 5, showing the turning of the bearing ball within the socket;
FIG. 7 is a view of the structure of FIG. 6, showing the ball further turned;
FIG. 8 is a view of the structure illustrated in FIG. 7, as viewed from the point 8 thereof, and
FIG. 9 is a view of the structure in FIG. 8, after the turning operation of the ball has been completed.

DESCRIPTION OF THE PREFERRED EMBODIMENT

A pair of like stampings 11 and 12 having truncated spherical walls 13 and 14 forming a socket when the stampings are affixed together in a suitable manner are herein illustrated by spot welds 15. The truncated spherical wall 13 has a slot 16 therein which is aligned with a deflected portion 17 of the truncated conical wall 14. The bearing is formed as a truncated spherical ball 18 provided with a cylindrical shaft receiving aperture 19. The distance between parallel faces 21 of the bearing ball is slightly less than the width of the slot 16 and a depression 17. This permits the ball 18 to be inserted within a socket 22 formed by the walls 13 and 14, as illustrated in FIG. 4. The center 23 of the ball will fall upon a center 24 of the socket 22 when the ball is disposed therewithin, as illustrated in FIG. 5. The ball is then turned 90° from the position illustrated in FIG. 5, as illustrated in FIGS. 6, 7 and 8, until in the position it will occupy when supporting a shaft as illustrated in FIG. 1. It will be noted in this arrangement that the single slot in the wall 13 and the deflected portion 17 in the wall 14 is all that is required to permit the ball 18 to be inserted and removed from the socket 22.

Annular slots 25 are provided within the cylindrical shaft-receiving aperture 19 adjacent to the faces 21 for the reception of O-rings 26, which seals the area between the O-rings against the escape of a lubricant. To lubricate the area between the O-rings 26, a fitting 27 is threaded into a threaded aperture 28 through the ball. When the ball is turned from the entering position 90° to the shaft receiving position, the fitting will enter a slot 29 in the wall 14, as illustrated in FIGS. 3 and 9, to prevent the ball from turning within the socket 22, after the shaft has been inserted therein.

It was pointed out hereinabove that the ball may be made of any bearing material, but is herein illustrated as being made from a plastic and, more patricularly, from a plastic known in the trade as Zytel which is a trade name covering a polyamide resin procurable from the Du Pont Company. The O-rings are made from neoprene or a like elastomeric material which is unaffected by the presence of the lubricant. For the specific application herein mentioned, the assembly is secured by a weld 31 to an axle housing 32 for supporting a brake operating cam shaft for angular movement within the aperture 19 of the ball 18, which supports the shaft and prevents it from deflecting. It is to understood, however, that this particular application is not limiting, and that the ball and socket can be employed for any shaft which is angularly actuated and requires support and stability.

What is claimed is:
1. In a shaft supporting bearing, a body having a truncated spherical socket formed from a pair of stampings having facing truncated spherical walls, a truncated bearing ball having a cylindrical aperture for a shaft which mates with the socket, one of the stampings having a single slot extending entirely through its wall from its inner to its outer periphery, the other having a recess aligned with the slot forming an entrance passageway therewith for the ball when turned 90° from its shaft receiving position whereby when the centers of the socket cavity and ball coincide after the insertion of the ball, the ball may be rotated 90° into shaft-receiving position.

2. In a shaft-supporting bearing as recited in claim 1, wherein a grease fitting is supported by the ball communicating with the shaft-receiving aperture and positioned to enter a slot in the wall having the recess for securing the ball against rotation when supporting the shaft.

3. In a shaft supporting bearing as recited in claim 2, wherein annular grooves are provided in the wall of the cylindrical aperture of said ball adjacent to the end surfaces thereof, and O-rings secured within the annular grooves.

4. In a shaft-supporting bearing as recited in claim 1, wherein the truncated bearing ball is made from plastic.

References Cited

UNITED STATES PATENTS

| | | | |
|---|---|---|---|
| 1,266,061 | 5/1918 | Scoville | 308—72 |
| 2,047,885 | 7/1936 | Riebe | 308—29 |
| 2,290,213 | 7/1942 | Shafer | 308—72 |
| 2,318,477 | 5/1943 | Firth | 308—30 |
| 2,825,608 | 3/1958 | Abel | 308—72 |
| 2,923,579 | 2/1960 | Scheel | 308—72X |

FOREIGN PATENTS

| | | | |
|---|---|---|---|
| 791,470 | 3/1958 | Great Britain | 308—72 |

OTHER REFERENCES

Automotive Industries, Sept. 1, 1954, pp. 107–108.

MARTIN P. SCHWADRON, Primary Examiner

I. C. COHEN, Assistant Examiner

U.S. Cl. X.R.

308—30, 72